US009635269B2

(12) United States Patent
Youn et al.

(10) Patent No.: US 9,635,269 B2
(45) Date of Patent: Apr. 25, 2017

(54) ELECTRONIC APPARATUS AND METHOD

(71) Applicant: SAMSUNG ELECTRONICS CO., LTD., Suwon-si, Gyeonggi-do (KR)

(72) Inventors: Joon-ho Youn, Yongin-si (KR); Si-cheon Oh, Suwon-si (KR); Sang-hyuk Cha, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 14/581,088

(22) Filed: Dec. 23, 2014

(65) Prior Publication Data

US 2015/0189187 A1 Jul. 2, 2015

(30) Foreign Application Priority Data

Dec. 30, 2013 (KR) ........................ 10-2013-0167242

(51) Int. Cl.
H04N 5/232 (2006.01)
H04N 5/77 (2006.01)
H04N 9/80 (2006.01)
H04N 9/804 (2006.01)

(52) U.S. Cl.
CPC ..... *H04N 5/23293* (2013.01); *H04N 5/23229* (2013.01); *H04N 5/772* (2013.01); *H04N 9/8047* (2013.01)

(58) Field of Classification Search
None
See application file for complete search history.

(56) References Cited

U.S. PATENT DOCUMENTS

| 8,879,858 | B1 * | 11/2014 | Mobbs | G06T 3/4015 375/240.11 |
|---|---|---|---|---|
| 2003/0090585 | A1 | 5/2003 | Anderson | |
| 2009/0273686 | A1 | 11/2009 | Kaikumaa et al. | |
| 2012/0218453 | A1 * | 8/2012 | Hosokawa | H04N 1/00307 348/333.11 |
| 2013/0135499 | A1 | 5/2013 | Song | |
| 2013/0222671 | A1 * | 8/2013 | Tseng | H04N 5/23216 348/333.11 |
| 2014/0036108 | A1 * | 2/2014 | Yoon | H04N 5/23229 348/231.99 |

(Continued)

OTHER PUBLICATIONS

Supplementary European Search Report and search opinion issued by the European Patent Office in related application EP14200044.7, May 12, 2015, 8 pages.

*Primary Examiner* — Timothy J Henn
(74) *Attorney, Agent, or Firm* — Drinker Biddle & Reath LLP

(57) ABSTRACT

A method of controlling a photographing apparatus including a main processor and an image processor is provided. The method includes transmitting, by the image processor to the main processor, transmission data that includes preview image data of an image photographed through a photographing module and, if image data that is parallel-processed with the preview image data exists, the image data; extracting, by the main processor, the preview image data from the transmission data; displaying the extracted preview image data on a display portion of the photographing apparatus; and if the image data is included in the transmission data, storing, by the main processor, the image data in a memory.

16 Claims, 6 Drawing Sheets

(56) References Cited

U.S. PATENT DOCUMENTS

| | | | |
|---|---|---|---|
| 2014/0078343 A1* | 3/2014 | Dai | H04N 5/772 |
| | | | 348/231.99 |
| 2014/0098119 A1* | 4/2014 | Ju | G06T 1/20 |
| | | | 345/555 |
| 2014/0105514 A1* | 4/2014 | Wu | H04N 19/176 |
| | | | 382/244 |
| 2014/0118596 A1* | 5/2014 | Nakazono | H04N 5/23293 |
| | | | 348/333.01 |

* cited by examiner

ELECTRONIC APPARATUS AND METHOD

CROSS-REFERENCE TO RELATED PATENT APPLICATION

This application claims the priority benefit of Korean Patent Application No. 10-2013-0167242, filed on Dec. 30, 2013, in the Korean Intellectual Property Office, the disclosure of which is incorporated herein in its entirety by reference.

BACKGROUND

1. Field

One or more embodiments of the invention relate to an electronic apparatus (e.g., a photographing apparatus) and method.

2. Description of the Related Art

Recently, a mobile operating system (OS) is installed on most mobile devices. The mobile OS provide many functions including a camera function. A device with a mobile OS installed thereon includes an image processor to provide an application processor with image data of an object received by an image sensor for image capturing.

In a photographing apparatus based on a mobile OS, when values of photographing parameters such as a shutter, zoom, focus, etc. are changed or the shutter is pressed for photographing, the application processor checks the changed values and transmits commands according to the changed values to the image processor, thereby operating a camera.

SUMMARY

One or more embodiments of the invention include an electronic apparatus (e.g., a photographing apparatus) that may reduce a photographing time or a shot-to-shot (STS) time, that is, a time taken before a next shot is performed after a previous shot, in a photographing apparatus including a main processor and an image processor, and a method of controlling the photographing apparatus.

Additional aspects will be set forth in part in the description which follows and, in part, will become apparent from the description, or may be learned by practice of the presented embodiments.

According to one or more embodiments, a method of controlling a photographing apparatus including a main processor and an image processor is provided. The method includes transmitting, by the image processor to the main processor, transmission data, where the transmission data includes preview image data of an image photographed through a photographing module and, if image data that is parallel-processed with the preview image data exists, the image data. The method further includes extracting, by the main processor, the preview image data from the transmission data and displaying extracted preview image data on a display portion of the photographing apparatus, and if the image data exists in the transmission data, storing, by the main processor, the image data in a memory.

The image data may be compressed image data.

The main processor may create a compressed file of the photographed image from the compressed image data stored in the memory.

The transmission data may be transmitted through a mobile industry processor interface (MIPI) between the main processor and the image processor.

A format of the transmission data may be a user-defined type of the MIPI.

The transmitting of the transmission data may include sequentially transmitting a plurality of pieces of transmission data that include a plurality of pieces of preview image data corresponding to a plurality of frames of the photographed image.

A piece of the transmission data may include preview image data with respect to one frame of the photographed image, one block of the parallel-processed image data, and header data including an index of the block and the number of blocks.

If the transmission data comprises the preview image data, the image data, and header data, the main processor may parse the header data and determine whether the image data exists.

At least one of the main processor and the image processor may not support a virtual channel protocol of the MIPI.

The main processor may be an application processor.

According to one or more embodiments, a photographing apparatus includes a image processor that transmits transmission data to a main processor, where the transmission data includes preview image data of an image photographed through a photographing module and, if image data that is parallel-processed with the preview image data exists, the image data, to the main processor. The main processor extracts the preview image data from the transmission data and displays the extracted preview image data on a display portion of the photographing apparatus. If the image data is included in the transmission data, the main processor stores the image data in a memory.

The image data may be compressed image data.

The main processor may create a compressed file of the photographed image from compressed image data stored in the memory.

The transmission data may be transmitted through a mobile industry processor interface (MIPI) between the main processor and the image processor.

A format of the transmission data may be a user-defined type of the MIPI.

The image processor may sequentially transmit a plurality of pieces of transmission data. The plurality of pieces of transmission data includes a plurality of pieces of preview image data corresponding to a plurality of frames of the photographed image.

A piece of the transmission data may include preview image data with respect to one frame of the photographed image, one block of the parallel-processed image data, and header data including an index of the block and the number of blocks.

When the transmission data includes the preview image data, the image data, and header data, the main processor may parse the header data of the transmission data and determine whether the image data exists.

At least one of the main processor and the image processor may not support a virtual channel protocol of the MIPI.

According to one or more embodiments, a non-transitory computer-readable recording medium has recorded thereon a program for executing the above method.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
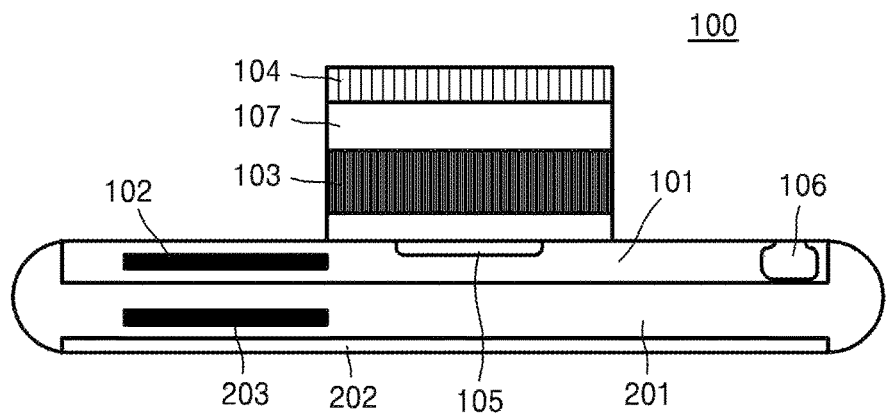
FIG. 1 is a diagram illustrating the outer appearance of an electronic apparatus (e.g., a photographing apparatus), according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. In the following description, when detailed descriptions about related well-known functions or structures are determined to make the gist of the invention unclear, the detailed descriptions will be omitted herein.

FIG. 1 is a diagram illustrating the outer appearance of an electronic apparatus (e.g., a photographing apparatus 100), according to an embodiment.

Referring to FIG. 1, the photographing apparatus 100 according to the present embodiment may have not only a photographing function but also various other functions. The photographing apparatus 100 includes an image processor block 101 for operating a camera and a main processor block 201 for performing various applications. The main processor of the main processor block 201 may be an application processor (AP).

The image processor block 101 may include a barrel 107 having a zoom ring 103 and a focus ring 104, a sensor 105, and an image processor 102. The main processor block 201 may include a main processor 203, a display portion 202, and a shutter button 106. The above-described configurations are provided for convenience of explanation and may be variously modified.

Figure 2:
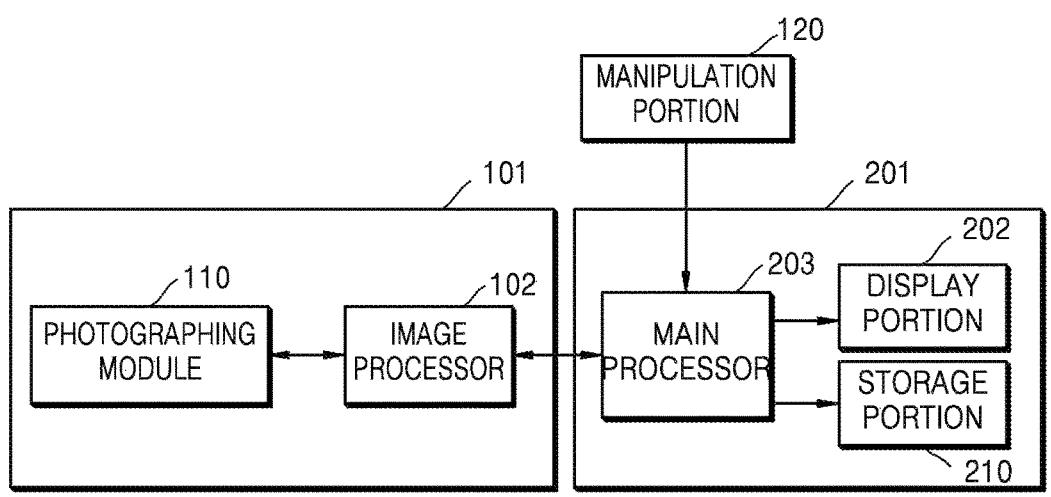
FIG. 2 is a block diagram schematically illustrating a structure of the photographing apparatus of FIG. 1.

FIG. 2 is a block diagram schematically illustrating a structure of the photographing apparatus of FIG. 1

Referring to FIG. 2, the photographing apparatus 100 may be divided into an image processor block 101 and a main processor block 201. A manipulation portion 120 is connected to the main processor 203 of the main processor block 201.

The main processor block 201 may include the main processor 203, the display portion 202, and a storage portion 210.

The main processor 203 controls an overall operation of the photographing apparatus 100, that is, photographing preparation, image reproduction preparation, photographed image displaying, storing, etc., by executing a photographing application of the photographing apparatus 10. Also, the main processor 203 may compress a photographed image transmitted by the image processor 102 and store the compressed image in the storage portion 210, or the main processor 203 may receive a compressed photographed image from the image processor 102 and store the received image in the storage portion 210;

Although not illustrated, a photographing module 110 of the image processor block 101 may include a lens unit, a lens driver, an aperture, an aperture driver, an imaging device, an imaging device controller, an analog signal processor, etc. The lens unit focuses an optical signal. The lens unit may include a zoom lens that controls a viewing angle to increase or decrease according to a focal length and a focus lens that focuses on an object. The zoom lens, the focus lens, and an object lens each may be provided either as a single lens or as a group of a plurality of lenses. The aperture controls an amount of incident light thereon by controlling a degree of opening/closing thereof. The lens driver and the aperture driver respectively drive the lens and the aperture according to a control signal from the image processor 102. The lens driver controls the focal length by controlling the position of the lens and performs operations such as auto-focusing, zooming, focus changing, etc. The aperture driver controls a degree of opening/closing of the aperture, in particular, an f-number or an aperture value, and thus operations such as auto-focus, automatic exposure correction, focus change, depth of field control, etc. may be performed.

An optical signal passing through the lens unit arrives at a light receiving surface of the imaging device to form an image of the object. The imaging device may be a charge coupled device (CCD), a complementary metal oxide semiconductor image sensor (CIS), or a high-speed image sensor, which converts the optical signal to an electric signal. A sensitivity of the imaging device may be controlled by the imaging device controller. The imaging device controller may control the imaging device according to a control signal that is manually input by a user's manipulation or a control signal that is automatically generated by an image signal input real time. An exposure time of the imaging device is controlled by using the shutter. The shutter includes a mechanical shutter for controlling incidence of light by moving a plurality of blades and an electronic shutter for controlling exposure of light by supplying an electric signal to the imaging device. The analog signal processor performs noise reduction, gain adjustment, waveform shaping, analog-to-digital conversion, etc. with respect to the analog signal supplied from the imaging device.

The manipulation portion 120 receives an input of a user from the outside, for example, a control signal. The manipulation portion 120 may include the shutter button 106 of FIG. 1 for inputting a shutter release signal to photograph an image by exposing the imaging device to light for a predetermined time period, a power button for inputting a control signal to control power on/off, a wide-angle zoom button and a telephoto-zoom button for increasing or decreasing a viewing angle according to an input, the zoom ring 103 of FIG. 1, the focus ring 104 of FIG. 1 for manually adjusting a focus, and a variety of function buttons for inputting text, selecting a mode such as a photographing mode or a reproduction mode, selecting a white balance setting function, selecting an exposure setting function, etc.

The photographing apparatus 100 stores in the storage portion 210 a program such as an operating system and an application system for operating the photographing apparatus 100 and data needed to perform an operation or a resultant data. The main processor 203 executes programs needed for a photographing operation.

The photographing apparatus 100 include the display portion 202 for displaying an operation state of the photographing apparatus 100 or information about a photographed image. The display portion 202 may provide a user with visible information and audible information. In order to provide visible information, the display portion 210 may be, for example, a liquid crystal display (LCD) panel, an organic light-emitting display (OLED) panel, etc. The display portion 202 displays image data output from the main processor 203.

The image processor 102 processes an input image signal and controls each constituent elements according to the input image signal or according to an external input signal. The image processor 102 may reduce noise of input image data and may perform an image signal process for enhancing image quality, such as gamma correction, color filter array interpolation, color matrix, color correction, color enhancement, etc. Also, the image processor 102 may create an image file by compressing the image data generated by performing the image signal process for enhancing image quality, or may restore image data from the image file. An image compression format may be a reversible format or an irreversible format. As an example of an appropriate format, a conversion to a Joint Photographic Experts Group (JPEG) format or a JPEG 2000 format may be used. Although the image processor 102 compresses the photographed image data, the main processor 203 may receive and compress the photographed image data. The compressed data is stored in the storage portion 210. Also, the image processor 102 may functionally perform clear processing, color processing, blur processing, edge enhancement processing, image analysis processing, image recognition processing, image effect processing, etc. Face recognition processing or scene recognition processing may be performed as the image recognition processing. For example, luminance level adjustment, color correction, contrast adjustment, contour emphasis adjustment, screen dividing processing, generation of a character image, and image synthesis processing may be performed.

Also, the image processor 102 generates a control signal to control auto-focusing, zooming, focus changing, automatic exposure correction, etc., and provides the control signal to the lens driver, the aperture driver, and the imaging device controller, and thus, the operations of the constituent elements provided in the photographing module 110, such as a shutter or a flash, may be controlled.

A photographing operation of the photographing apparatus 100 including the main processor 203 and the image processor 102 is described with reference to FIGS. 1 and 2.

In the present embodiment, when a shutter release signal generated by the shutter 106 is transmitted to the main processor 203, the main processor 203 transmits the shutter release signal to the image processor 102. Then, photographing is performed according to the shutter release signal and the image processor 102 transmits image information (image data or compressed image data) of a photographed object to the main processor 203. The main processor 203 stores the image information of the object received from the image processor 102 in the storage portion 210 or a memory card (not shown) as a non-compressed file or a compressed file.

Figure 3:
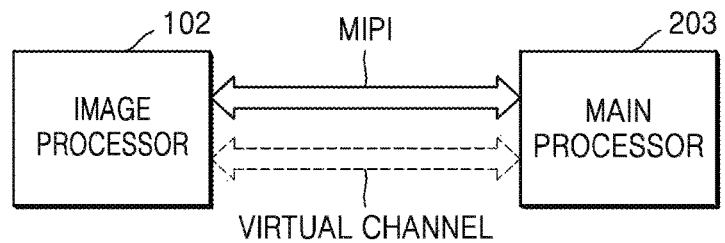
FIG. 3 is a block diagram illustrating an interface between an image processor and a main processor of FIG. 2.

FIG. 3 is a block diagram illustrating an interface between the image processor 102 and the main processor 203 of FIG. 2.

Referring to FIG. 3, the image processor 102 and the main processor 203 exchange image data through a mobile industry processor interface (MIPI). The MIPI may be used for data communication between processors, that is, the main processor 203 and the image processor 102, in the photographing apparatus 100 according to the present embodiment.

In general, mobile devices are generally configured with hardware and software. In terms of hardware, a processor or a system-on-chip (SOC) manufactured by a variety of makers is installed in the center of a mobile device and is connected to a camera, a display, a memory, etc. An application program, that is, software, is installed in the processor. MIPI is a new interface standard for hardware and software between a processor and peripheral devices.

As illustrated in FIG. 3, image processing is performed on the photographed image by the image processor 102, the processed image data is transferred to the main processor 203 through the MIPI, and the image data is transmitted to and displayed on the display portion 202 or is stored in the storage portion 210.

When MIPI is used, interleaved data different from each other may be transmitted in a data stream through a virtual channel. Also, different types of data may be transmitted through a physical MIPI channel using a virtual channel identifier.

In a photographing apparatus using an image processor and a main processor, preview and JPEG image data processed by the image processor may be received through the MIPI. In order to increase an STS photographing speed, the preview data may be transmitted even before the image processor 102 completes capturing and transmitting JPEG data through a virtual channel of the MIPI. And when JPEG data is prepared, the JPEG data may be transmitted through a separate virtual channel. However, if one of the image processor 102 and the main processor 203 does not support a virtual channel protocol of the MIPI, the virtual channel may not be used. Accordingly, the STS photographing speed may be improved through the above-described method.

Since the photographing apparatus according to the present embodiment selectively transmits image data or compressed data to preview the image data even when one of the image processor 102 and the main processor 203 does not support the virtual channel, preview display timing may be reduced, and thus, 51 (AF Lock) may start first, thereby reducing the STS photographing time.

Figure 4A:
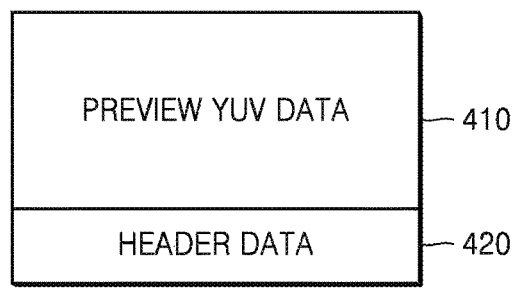
FIGS. 4A to 4C are diagrams illustrating a format of transmission data processed in an image processor of a photographing apparatus, according to another embodiment.
Figure 4B:
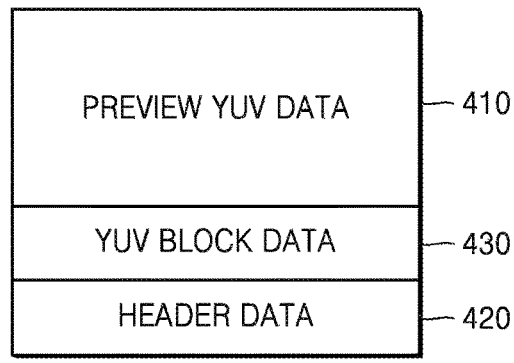
Figure 4C:
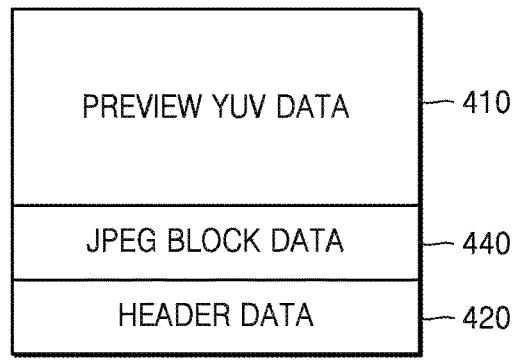

FIGS. 4A to 4C are diagrams illustrating a format of transmission data in the image processor 102 of the photographing apparatus 100, according to another embodiment. In the transmission data of the image processor 102 according to the present embodiment, an MIPI data format is set to a user-defined type and data formats as illustrated in FIGS. 4A to 4C may be used.

Referring to FIG. 3 together with FIGS. 4A to 4C, the generation of the transmission data in the image processor 102 is described.

The image processor 102 may perform image processing on an image captured through the photographing module 110 to generate a data format including the preview YUV data 410 and the header data 420, as illustrated in FIG. 4A, and may transmit the data format to the main processor 203. Although the preview YUV data 410 is described in this embodiment, the preview YUV data 410 is not limited to an image signal in the YUV color space. The image processor 102 converts an image signal (RGB) of an object acquired by an image sensor to a YUV signal and performs image processing to generate a preview image by reducing an original image. The image processor 102 generates the preview YUV data 410 obtained by reducing the original image data. The header data 420 may include information about the preview YUV data 410 and information about a frame of a consecutive preview image.

When the image processing is performed on the original image, as illustrated in FIG. 4B, the image processor 102 may generate a data format including the preview YUV data 410, a YUV block data 430, and the header data 420 and transmit the data format to the main processor 203. When the size of the original image is large, the YUV block data 430 signifies a block data obtained by dividing the original image according to the preview YUV data 410 that corresponds to one frame. The header data 420 may include an index of the YUV block data 430 and the number of blocks. For example, if the size of the original image is large, the original image may be divided based on the size of the preview YUV data 410 into first to fourth original images. In this case, the first original image corresponds to first YUV block data, the second original image corresponds to second YUV block data, the third original image corresponds to third YUV block data, and the fourth original image corresponds to fourth YUV block data. The index of the YUV block data 430 is "1" for the first original image, "2" for the second original image, "3" for the third original image, and "4" for the fourth original image. The number of block is "4" in this case. Furthermore, a block and a frame may have the same size.

When the image processing is performed on the original image, as illustrated in FIG. 4C, the image processor 102 may generate a data format including the preview YUV data 410, a JPEG block data 440, and the header data 420 and transmit the data format to the main processor 203. The JPEG block data 440 is data obtained by compressing the original image data or YUV original image data. If the size of the compressed data is large, the JPEG block data 440 signifies a block data obtained by dividing the original image according to the preview YUV data 410 that corresponds to one frame. The header data 420 may include an index of the JPEG block data 440 and the number of blocks. Although JPEG is described as a still image compression method, the invention is not limited thereto and compression data used in a different compression method may be transmitted via the same method.

The main processor 203 receives the transmission data according to one of FIGS. 4A to 4C and parses the header data 420 so as to check whether image data or JPEG data is included in the received transmission data. When the image data or JPEG data is included in the received transmission data, the received image data or JPEG data is temporarily stored in the storage portion 210. The storage portion 210 may be a temporary buffer or a temporary memory. Also, the header data 420 received together with the image data or JPEG data may be used when a compressed file is created by compressing the image data or a JPEG file is created from the JPEG data.

The main processor 203 extracts preview YUV data 410 included in the transmission data as shown in one of FIGS. 4A to 4C and displays the extracted preview YUV data as a preview image on the display portion 202.

Figure 5:
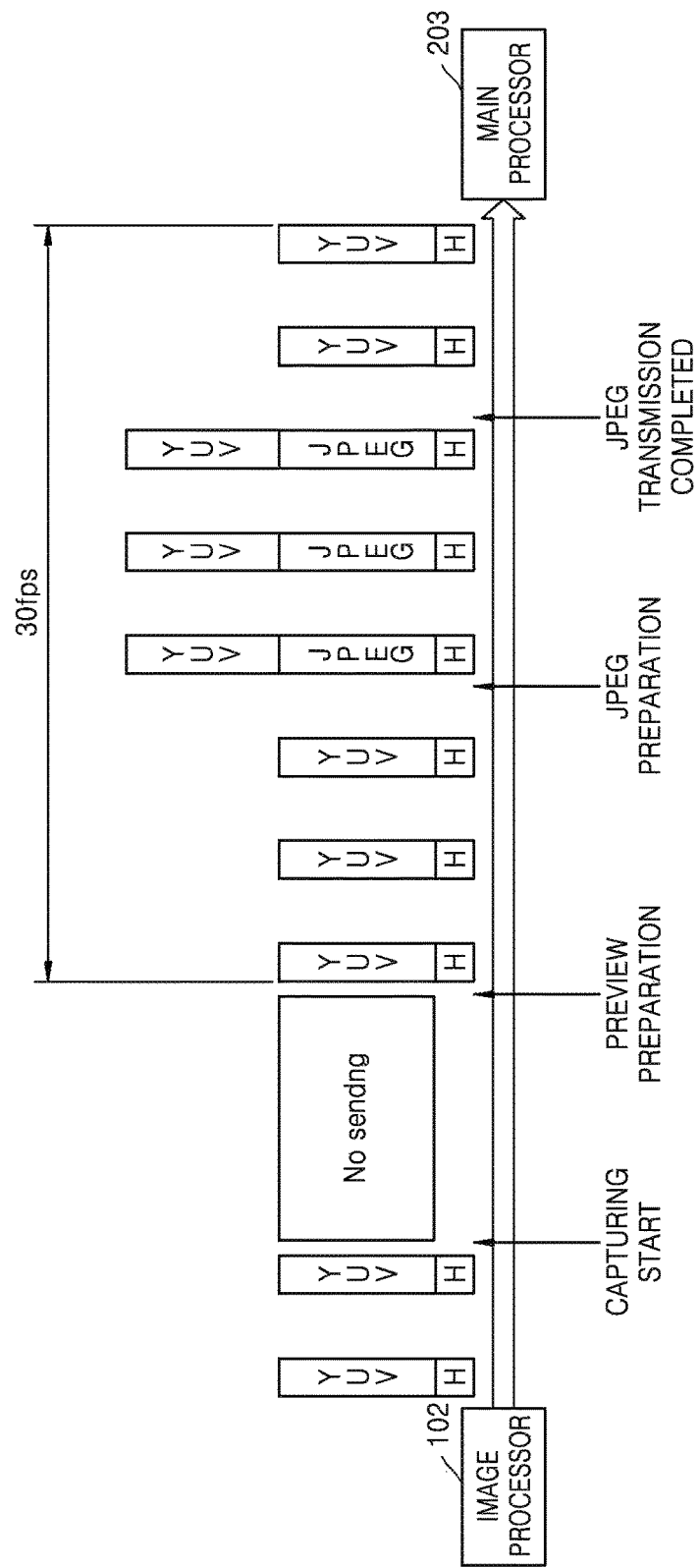
FIG. 5 is a diagram illustrating data transmission between an image processor and an main processor during a photographing process, according to another embodiment.

FIG. 5 is a diagram illustrating the data transmission between the image processor 102 and the main processor 203 during a photographing process, according to another embodiment.

Referring to FIG. 5, the image processor 102 transmits to the main processor 203 image data in a data format as shown in FIGS. 4A and 4B.

While transmitting the preview YUV data for each frame, the image processor 102 stops the transmission when image capturing begins (i.e., Capturing Starts). In the transmission process, image processing is performed to generate a preview image of a captured image. When preparation of a preview or a live preview is completed (i.e., "Preview Preparation"), the preview YUV data corresponding to each frame is transmitted. And when the preparation of a JPEG image is completed (i.e., "JPEG Preparation"), the JPEG block data is transmitted by being included in the preview YUV data. When the transmission of the JPEG image is completed (i.e., "JPEG Transmission Completed"), the preview YUV data is transmitted again.

As illustrated in FIG. 5, when the size of JPEG data is large, the JPEG data is difficult to transmit by one frame. Accordingly, the JPEG data is divided by a block of a particular size so as to be transmitted in a plurality of frames, for example, in three frames as illustrated in FIG. 5. In the present embodiment, when the preview image data is ready to be created even before the JPEG data is generated after the image capturing operation, that is, when a first image processing is completed, the image processor 102 performs a second image processing for parallel compression and then transmits the preview image data and compressed image data to the main processor 203. Accordingly, in the main processor 203, after photographing, the preview display timing may be reduced and thus S1 (AF Lock) may start first, thereby reducing the STS photographing time. The first image processing may denote processing of a preview image. The second image processing may denote image processing of original image data. Also, the second image processing may denote image processing for simultaneously processing and transmitting the preview data.

Although FIG. 5 illustrates transmission of the preview YUV data and both the preview YUV data and the JPEG data, as illustrated in FIG. 4C, the preview YUV data and both the preview YUV data and the YUV data (as illustrated in FIG. 4B) may be transmitted.

Figure 6A:
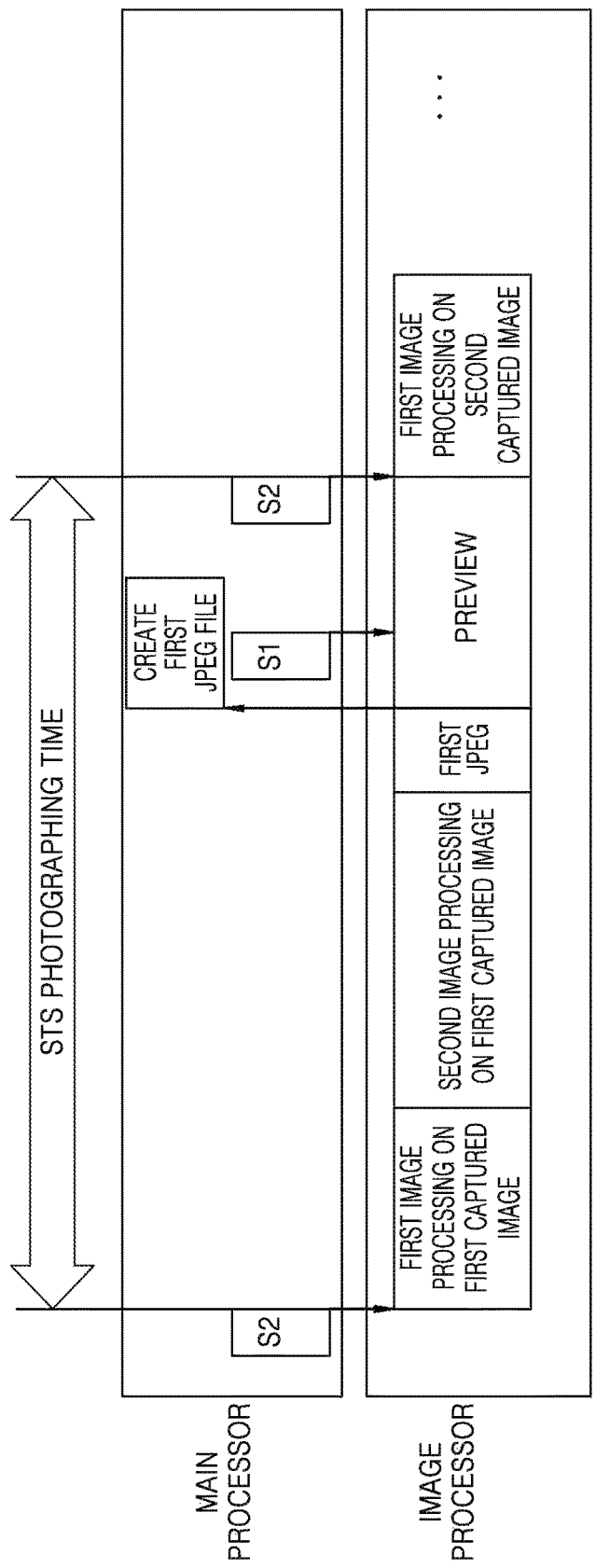
FIG. 6A is a diagram illustrating a method of controlling a photographing apparatus of the related art.
Figure 6B:
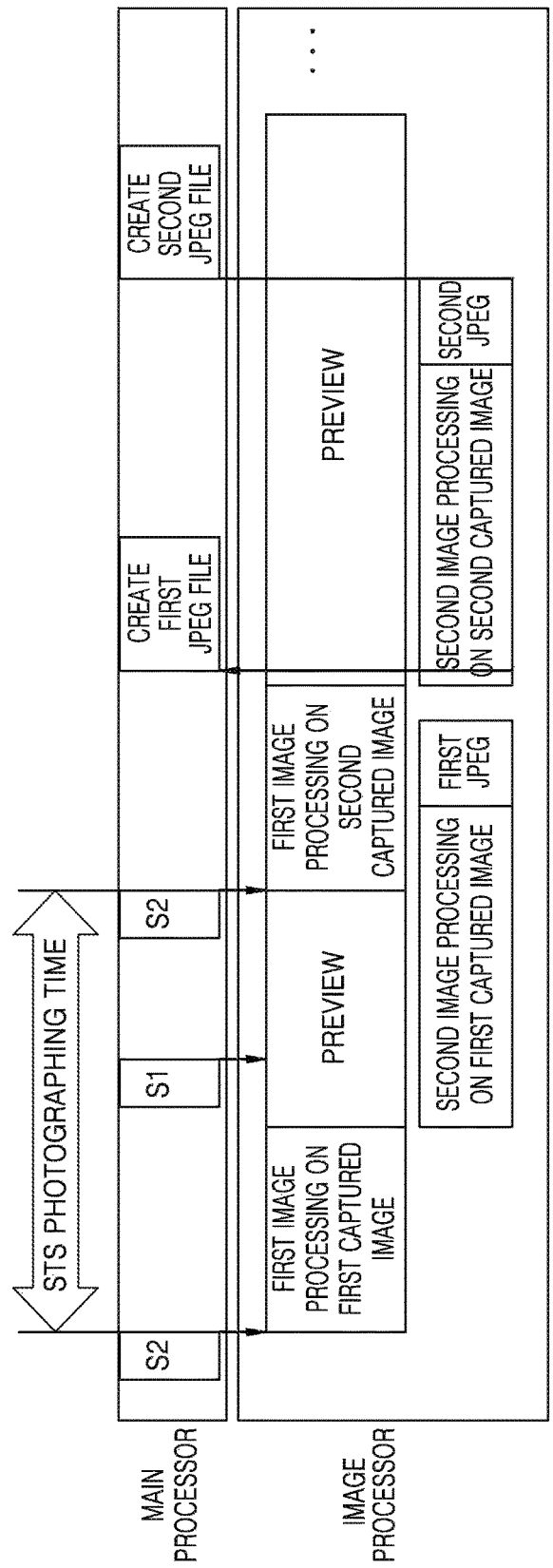
FIG. 6B is a diagram illustrating a method of controlling a photographing apparatus, according to an embodiment.

FIG. 6A is a diagram illustrating a method of controlling a photographing apparatus of the related art. FIG. 6B is a diagram illustrating a method of controlling a photographing apparatus (e.g., photographing apparatus 100), according to an embodiment.

As illustrated in FIG. 6A, according to an S2 request transmitted from a main processor of the photographing apparatus of the related art, an image processor performs first image processing on a first captured image, second image processing on the first captured image, generating first JPEG data with respect to the first captured image, and then transmits the first JPEG data to the main processor. Accordingly, the main processor creates a first JPEG file. In the image processor of the related art, since data is transmitted to the main processor after JPEG data is generated in the image processor, a preview image may not be displayed until a JPEG file is created.

As illustrated in FIG. 6B, according to the S2 request transferred from the main processor 203, the image processor 102 performs the first image processing on the first captured image and transmits a preview image to the main processor 203, and thus the main processor 102 displays the preview image. While transmitting a live view image to the main processor 203, the image processor 102 performs the second image processing on the first captured image in parallel. When the first JPEG data is generated, the first JPEG data is transmitted with the preview image. Although the first JPEG data is transmitted after the transmission of the preview data with respect to the first captured image as illustrated in FIG. 6B, with transmission of a next preview data, the second image processing on the second captured image may be performed together with transmission of the preview data for the third capturing operation and the generation of the second JPEG data. Accordingly, since the live view image transmission and the second image processing on the first captured image are performed in parallel, during the transmission of the preview data for second image capturing operation, the first JPEG data of the first captured image may be transmitted (when the second image processing on the first captured image is completed) with the transmission of the preview data for the second image capturing operation. Accordingly, since the parallel processing according to the present embodiment is simultaneously performed with the transmission of the preview data and the compressed data, the preview display timing may be reduced and thus a time for the next photographing operation may be reduced.

Figure 7:
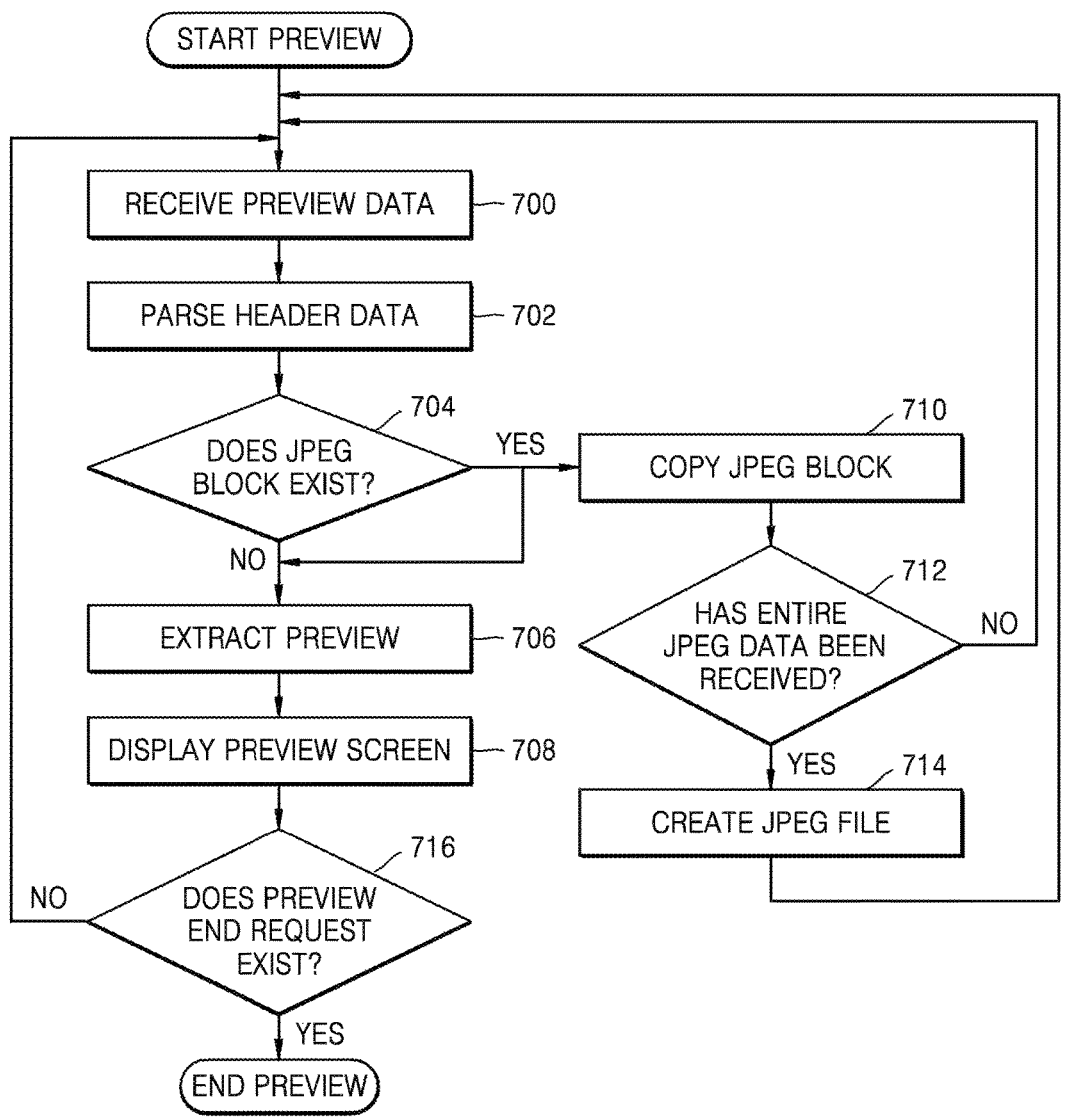
FIG. 7 is a flowchart illustrating a method of controlling a photographing apparatus, according to another embodiment.

FIG. 7 is a flowchart illustrating a method of controlling the photographing apparatus 100, according to another embodiment.

Referring to FIG. 7, in operation 700, the main processor 203 receives frame data. The frame data denotes a consecutive data sequence for preview display. The frame data, as illustrated in FIGS. 4A to 4C, may include the preview data and the header data, or the preview data, the image data/the compressed data, and the header data. In other words, in the image processor 102, after the processing of the preview data is completed, the processing of the image data or the compressed data is performed in parallel with each other. After the parallel processing is completed, the image data/the compressed data that were parallel-processed with the preview data are transmitted altogether.

In operation 702, the header data included in the frame data is parsed. The main processor 203 parses the header data and determines whether the image data/compressed data is included in the frame data. Also, when the image data/the compressed data is large, the header data includes the size of a divided block and the number of blocks. As described in operations 712 and 714, the header data may be used to determine whether the entire compressed data is received or the header data may be used to create a JPEG file. Although FIG. 7 illustrates a case when the compressed data is received, the present embodiment may also be applied to a case when the image data is received. Also, when the main processor 203 receives the image data, the received image data may be compressed and the main processor 203 may change the compressed image data to compressed data.

In operation 704, it is determined whether a JPEG block exists. If the header data includes information about a JPEG block, the program proceeds to operation 706 if no JPEG block exists. If a JPEG block exists, then operations 710, 712, 714 and operations 706, 708, 716 are performed together.

If it is determined in the operation 704 that the JPEG block exists, the JPEG block is copied to a buffer (not shown) in operation 710. In operation 712, it is determined whether the entire JPEG data is received. If it is determined in the operation 712 that the entire JPEG data is received, a JPEG file is created in operation 714. Otherwise, the program goes back to the operation 700.

If it is determined in the operation 704 that the JPEG block does not exist, the program proceeds to operation 706. If it is determined in the operation 704, that the JPEG block exists, then operations 710, 712, 714 are performed simultaneously and in parallel with operation 706.

In the operation 706, the preview data included in the frame data is extracted.

In operation 708, the preview data is displayed.

In operation 716, if a preview end request exists, the preview ends. Otherwise, the program returns to the operation 700.

The photographing apparatus 100 according to the present embodiment may be used when the main processor 203 or the image processor 102 does not support the MIPI virtual channel protocol. This case presents a problem for a photographing apparatus of the related art, in which the operation of preview display data and S1 is available only after the processing of the captured image is completed and after a JPEG file is created.

Also, since the image data or the compressed data that is parallel-processed with the preview data is transmitted with the preview data, the preview display timing and the STS photographing time may be reduced.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A method of controlling a photographing apparatus including a main processor and an image processor, the method comprising:
   transmitting, by the image processor to the main processor, transmission data, wherein the transmission data comprises:
      preview image data of an image photographed through a photographing module, and
      if image data that is parallel-processed with the preview image data exists, the image data;
   extracting, by the main processor, the preview image data from the transmission data; and
   displaying the extracted preview image data on a display portion of the photographing apparatus,
   wherein if the image data is included in the transmission data, storing, by the main processor, the image data in a memory,
   wherein the transmitting of the transmission data comprises sequentially transmitting a plurality of pieces of transmission data, the plurality of pieces of transmission data comprising a plurality of pieces of preview image data corresponding to a plurality of frames of the photographed image, and
   wherein a piece of the transmission data comprises:
      preview image data with respect to one frame of the photographed image,
      one block of the parallel-processed image data, and
      header data including an index of the block and the number of blocks.

2. The method of claim 1, wherein the image data is compressed image data.

3. The method of claim 2, further comprising:
   creating, by the main processor, a compressed file of the photographed image from compressed image data stored in the memory.

4. The method of claim 1, wherein the transmission data is transmitted through a mobile industry processor interface (MIPI) between the main processor and the image processor.

5. The method of claim 4, wherein a format of the transmission data is a user-defined type of the MIPI.

6. The method of claim 1, wherein if the transmission data comprises the preview image data, the image data, and header data, the method further comprises:
   parsing, by the main processor, the header data; and
   determining whether the image data exists.

7. The method of claim 1, wherein at least one of the main processor and the image processor does not support a virtual channel protocol of the MIPI.

8. The method of claim 1, wherein the main processor is an application processor.

9. A non-transitory computer-readable recording medium having recorded thereon a program for executing the method of claim 1.

10. A photographing apparatus comprising:
    a image processor that transmits transmission data to a main processor, wherein the transmission data comprises:
       preview image data of an image photographed through a photographing module, and
       if image data that is parallel-processed with the preview image data exists, the image data; and
    the main processor extracts the preview image data from the transmission data and displays the extracted preview image data on a display portion of the photographing apparatus, wherein if the image data is included in the transmission data, the main processor stores the image data in a memory, wherein the image processor sequentially transmits a plurality of pieces of transmission data comprising a plurality of pieces of preview image data corresponding to a plurality of frames of to the photographed image, and wherein a piece of the transmission data comprises:
preview image data with respect to one frame of the photographed image,
one block of the parallel-processed image data, and
header data including an index of the block and the number of blocks.

11. The photographing apparatus of claim 10, wherein the image data is compressed image data.

12. The photographing apparatus of claim 11, wherein the main processor creates a compressed file of the photographed image from compressed image data stored in the memory.

13. The photographing apparatus of claim 10, wherein the transmission data is transmitted through a mobile industry processor interface (MIPI) between the main processor and the image processor.

14. The photographing apparatus of claim 13, wherein a format of the transmission data is a user-defined type of the MIPI.

15. The photographing apparatus of claim 10, wherein when the transmission data comprises the preview image data, the image data, and header data, the main processor parses the header data of the transmission data and determines whether the image data exists.

16. The photographing apparatus of claim 10, wherein at least one of the main processor and the image processor does not support a virtual channel protocol of the MIPI.

* * * * *